No. 659,764. Patented Oct. 16, 1900.
W. G. RALSTON.
BED WARMER.
(Application filed Nov. 2, 1898.)
(No Model.)
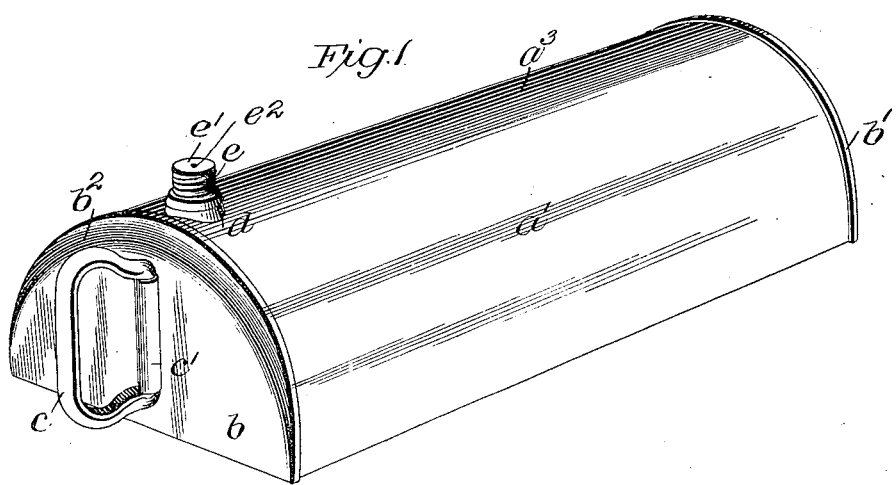
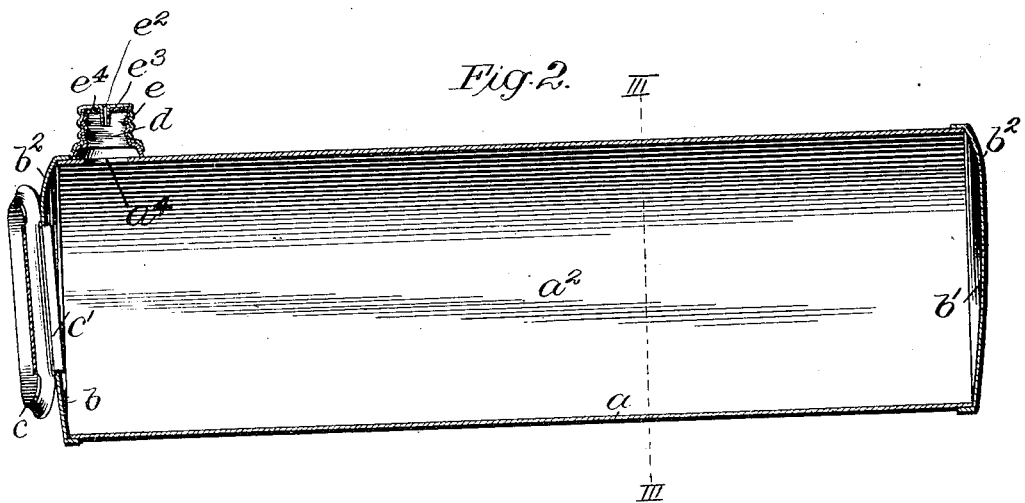
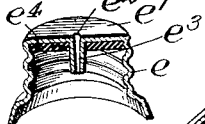
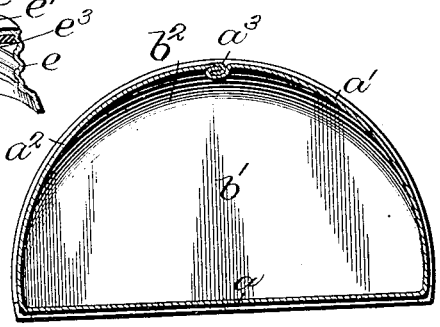
Witnesses
Inventor

UNITED STATES PATENT OFFICE.

WILLIAM G. RALSTON, OF EVANSVILLE, INDIANA.

BED-WARMER.

SPECIFICATION forming part of Letters Patent No. 659,764, dated October 16, 1900.

Application filed November 2, 1898. Serial No. 695,303. (No model.)

*To all whom it may concern:*

Be it known that I, WILLIAM G. RALSTON, a citizen of the United States, residing at Evansville, in the county of Vanderburg and State of Indiana, have invented certain new and useful Improvements in Bed-Warmers; and I do hereby declare the following to be a full, clear, and exact description of the invention, such as will enable others skilled in the art to which it appertains to make and use the same.

The healthful advantages to be derived from warming beds in cold weather have long been recognized and various expedients have been resorted to, such as the placing of heated flat-irons, bricks, soapstone slabs, and jugs of water in the bed; but these things are apt to inconvenience the occupant and cause discomfort by reason of their shape, and, moreover, their warming efficiency is quite limited and the handling of them is attended with some difficulty. Sheet-metal receptacles of various forms and constructions have also been used, but with them difficulty has been experienced from their seams and joints soon becoming defective by reason of strains due to exterior pressure consequent upon the forming of a partial vacuum within the receptacle when the water cools. By my present invention I propose to provide a bed-warmer of a peculiar shape which specially adapts it for use in a bed without discomfort or inconvenience of any kind to the occupant thereof, while at the same time the article is most effective in warming the bed, and provision is made for preserving all seams or joints intact.

The drawings which accompany and form part of this specification illustrate a preferred form of embodiment of the invention.

Figure 1 represents the bed-warmer in perspective. Fig. 2 represents the same in longitudinal section. Fig. 3 is a cross-section on the line III III of Fig. 2. Fig. 4 is a detail sectional view of the cap for closing the nipple.

The bed-warmer is in the form of a sheet-metal receptacle adapted to contain a supply of hot water, and in the drawings the reference-letter $a$ designates the bottom, which is flat and of rectangular outline, and the letters $a'$ and $a^2$ designate the sides, bent up from said flat bottom and curved so that they may together form somewhat more than half a cylinder, their edges being united by a suitable seam, as at $a^3$, so that these portions $a'$ and $a^2$ also constitute the top of the receptacle. The ends of the receptacle are composed of semicircular plates $b$ and $b'$, which are flanged so as to take over the end edges of the sides, top, and bottom, with which they are united in such a manner as to prevent leakage of water from the receptacle, these end plates being preferably somewhat convex and their convexity increasing toward their upper parts, as shown at $b^2$. A handle $c$, of appropriate form, is applied to the end plate $b$ by means of a clip $c'$, suitably fastened to such end plate in a manner to prevent leakage at this point. There is on top of the warmer, near one end, a screw-threaded nipple $d$, soldered or otherwise connected with the plates $a'$ and $a^2$ and surrounding an opening $a^4$, formed in the latter, which opening and nipple give access to the interior of the receptacle for filling and emptying the same. A screw-threaded cap is applied to the nipple as a closure for the said opening, and said cap is preferably of the form shown in Fig. 4, comprising a screw-threaded portion $e$, a top piece $e'$, having a small hole $e^2$ at the center thereof, and a short reëntrant open-ended tube $e^3$, the interior of which is in alinement with such hole. A compressible washer or gasket $e^4$ surrounds said reëntrant-tube and fits against the top $e'$, so that when the cap is screwed upon the nipple this washer will be pressed against the edge of the latter, so as to effect a water-tight joint.

As thus constructed the device is simple and inexpensive, yet efficient and reliable in use, and is capable of withstanding great strain and pressure and the frequent and more or less rapid expansion and contraction of the metal caused by the heating and cooling of the fluids used therein without liability to leakage at the joints. The great difficulty heretofore experienced with devices of this character has been to prevent leakage at the joints, which results from the cooling of their liquid contents, and the more or less complicated construction of such devices as have heretofore been proposed renders them particularly vulnerable to the aforesaid injurious effects of rapid expansion and contraction of the metal at the joints. My device, consisting of the oblong semicylindrical structure, with its end caps and flat bottom, with integral rounded top, and the filling tube or nipple on said top, with its screw-threaded cap having the air-hole or reëntrant-tube, is adapted to accomplish the desired result without the annoyance and inconvenience which is incident to the use of such devices as heretofore constructed when subjected, as they necessarily are in use, to alternating periods of expansion and contraction of the metal at frequent intervals. The filling-tube is advantageously located on top of the receptacle, which still further decreases the liability to leakage or the escape of the water by the sudden movement of the device accidentally or otherwise, and the reëntrant-tube renders the escape of water by a quick or sudden movement of the receptacle very difficult and impossible to any appreciable extent. The opening in the filling-cap or reëntrant-tube, which is usually not larger than a small sewing-machine needle, permits the required amount of air to be admitted into the water-chamber to prevent the formation of a partial vacuum therein and consequent contraction of the water-chamber, which is liable to produce leakage at the joints, the air also equalizing the pressure within the chamber and relieving strain on the joints.

It will be seen that the form of receptacle illustrated in the drawings herewith and above described is such as to admirably adapt it for use in a bed, resting therein upon its flat bottom a, and there are no protruding sharp edges or corners to cause discomfort to the occupant. The small hole in the cap admits air to the interior of the warmer as the body of water therein is reduced, and thus prevents straining of the joints.

The preferred mode of using the warmer is to fill it nearly full with clear water and then place it on a hot stove with the cap off and let it remain so until the water is heated to the boiling-point, when the warmer is removed and the cap screwed on, after which the warmer is immediately carried to the bed and placed between the covers wherever it is desired to have the greatest heat. When used at the foot of the bed, it should always be placed lengthwise of the bed, with the lower end near the footboard, in which position it gives the best results and is not in the way of the feet. If two persons occupy the same bed, the warmer should be placed between their respective feet. The warmer being once filled the water therein may be heated and reheated indefinitely without necessitating a change of water, and the device being in compact form it will retain a comfortable heat in a bed from twelve to fourteen hours.

This warmer may also be used in carriages or sleighs for warming the feet, and it may be varied in size as may be desired to suit different latitudes or other requirements in use.

Having thus fully described my invention, what I claim as new, and desire to secure by Letters Patent of the United States, is—

1. In a bed-warmer, the combination of the sheet-metal receptacle of elongated form with rounded top having a screw-threaded nipple thereon, a correspondingly-threaded cap having a reëntrant-tube, and a gasket surrounding the latter, substantially as and for the purpose described.

2. As a new article of manufacture, a bed-warmer comprising an oblong metallic receptacle having a flat bottom and oval or rounded top and sides and substantially-semicircular ends, the top, bottom and sides thereof being formed in a single piece, an open-ended nipple on said top having a detachable cap or cover provided with a pendent air-inlet or reëntrant tube, and a handle attached to one of said ends, the whole constructed and adapted to operate substantially as and for the purpose described.

In testimony whereof I affix my signature in presence of two witnesses.

WILLIAM G. RALSTON.

Witnesses:
ALVAH JOHNSON,
SAMUEL VICKERY.